United States Patent [19]

Suda

[11] Patent Number: 5,289,327
[45] Date of Patent: Feb. 22, 1994

[54] HARD DISK INSPECTION APPARATUS

[75] Inventor: Koichi Suda, Narashino, Japan

[73] Assignee: Seiko Seiki Kabushiki Kaisha, Japan

[21] Appl. No.: 898,512

[22] Filed: Jun. 15, 1992

[30] Foreign Application Priority Data

Jun. 18, 1991 [JP] Japan .................. 3-045808[U]

[51] Int. Cl.$^5$ .............................................. G11B 5/56
[52] U.S. Cl. ..................... 360/109; 324/212
[58] Field of Search ................ 360/109; 324/212, 226

[56] References Cited

U.S. PATENT DOCUMENTS

| 3,984,763 | 10/1976 | Koester et al. | 324/212 |
| 4,158,212 | 6/1979 | Dattilo | 350/109 |
| 5,189,569 | 2/1973 | Kurasawa | 360/109 X |

FOREIGN PATENT DOCUMENTS

| 85679 | 5/1986 | Japan | 360/109 |
| 17684 | 2/1990 | Japan . | |

*Primary Examiner*—Richard E. Gluck
*Attorney, Agent, or Firm*—Bruce L. Adams; Van C. Wilks

[57] ABSTRACT

A hard disk inspection apparatus has a fixed magnetic head for magnetically recording data on and reproducing data from an outside recording area of the back surface of a hard disk and a fine-adjustment magnetic head with a micrometer mechanism for magnetically recording data on and reproducing data from an outside recording area of the front surface of the hard disk. Both heads are mounted on a carriage. A fixed magnetic head for magnetically recording data on and reproducing data from an inside recording area of the back surface of the hard disk and a fine-adjustment magnetic head with another micrometer mechanism for magnetically recording data on and reproducing data from an inside recording area of the front surface of the hard disk are both mounted on another carriage. This arrangement enables easy and accurate alignment between the magnetic heads and improves the inspection efficiency.

4 Claims, 4 Drawing Sheets

HARD DISK INSPECTION APPARATUS

BACKGROUND OF THE INVENTION

This invention relates to a hard disk inspection apparatus for inspecting magnetic recording and reproducing characteristics of a hard disk (information storing medium) to be built in a computer or the like.

This type of a hard disk inspection apparatus is already disclosed in Japanese Utility Model Laid-Open No. 17684/1990. This hard disk inspection apparatus simultaneously inspects the front surface and the back surface of a hard disk by dividing the surfaces into an outside magnetic recording area and inside magnetic recording area, respectively, in order to shorten the hard-disk inspection time.

Therefore, two pairs of carriages are arranged at the both sides of a hard disk rotating on the spindle so that they face each other, two magnetic heads are set to the end of one pair of carriages so that they are provided on the front surface and the back surface of the hard disk, and a fine-adjustment magnetic head provided on the surface of the hard disk and a magnetic head provided on the back thereof are set to the other pair of carriages so that the displacement can be fine-adjusted by a micrometer.

In this manner, inspection is performed by four magnetic heads at the same time.

When four magnetic heads are set, an error of, for example, approx. 0.5 mm is produced at the carriage or magnetic head setting position. However, because it is necessary to keep the error within 2 to 3 $\mu$m for effective inspection, the fine-adjustment magnetic head is fine adjusted by the micrometer.

This structure prevents the inspection of recording tracks from being neglected or performed twice at the boundary between two divided areas, (outside and inside magnetic recording areas) by fine-adjusting the position of the fine-adjustment magnetic heads when magnetically recording inspection signals in a hard disk by using a magnetic head before reproducing them or when inspection known missing pulse errors, extra pulse errors, positive modulation, and negative modulation with the reproduced signals after erasing magnetic records.

However, the conventional hard disk inspection apparatus can only adjust one magnetic head precisely with one micrometer. In this case, it is possible to adjust the displacement between two magnetic heads arranged on the front surface of the hard disk and that between two magnetic heads arranged on the back surface of the hard disk but it is impossible to adjust the displacement between two magnetic heads for the front surface and the back surface arranged on one carriage.

It is also impossible to adjust the displacement between two magnetic heads each other arranged on both carriages. For example, if a hard disk is inversely set in order to determine the electrical characteristics of one of a pair of magnetic heads, the inspection efficiency is not improved because the initially recorded position becomes unclear.

SUMMARY OF THE INVENTION

It is an object of the present invention to provide an excellent hard disk inspection apparatus for easily and securely realizing accurate alignment of a pair of magnetic heads when magnetically recording and reproducing data in and from each area at the front surface and the back surface of a hard disk and for improving the inspection efficiency.

To achieve the above object, the hard disk inspection apparatus of the present invention is equipped with a spindle to which a hard disk to be inspected is set, a plurality of front surface and back surface magnetic-head pairs for magnetically recording and reproducing data in and from a plurality of areas formed by dividing the magnetic-recording surfaces of the hard disk, and a plurality of means with a plurality of the magnetic-head pairs arranged on them respectively for reciprocating each pair of magnetic heads on a line passing through the center of the hard disk. A micrometer moving mechanism is included which fine-adjusts either one of each pair of the front and back magnetic heads on the line passing through the center of the hard disk.

Because the hard disk inspection apparatus of the present invention makes it possible to fine-adjust either and of each magnetic head pair reciprocating on the line passing through the center of the hard disk, accurate alignment of a pair of magnetic heads can easily and securely be made when magnetically recording and reproducing data in and from each divided area at the surface and back of the hard disk and the inspection efficiency is improved.

DETAILED DESCRIPTION OF THE PREFERRED EMBODIMENTS

The structure of an embodiment of the hard disk inspection apparatus of the present invention is described below by referring to the accompanying drawings.

Figure 1:
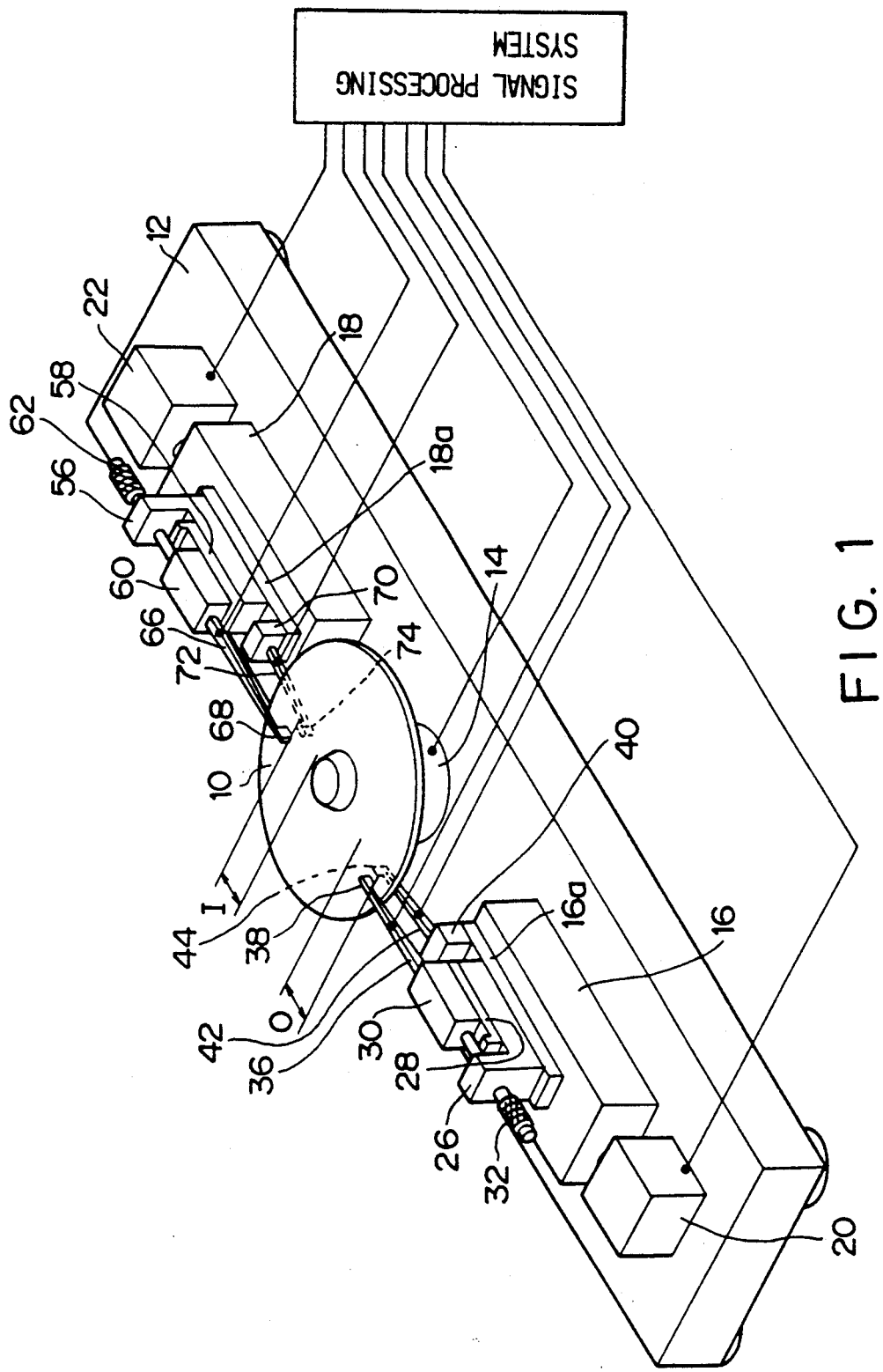
FIG. 1 shows a perspective view of the structure of an embodiment of the hard disk inspection apparatus of the present invention.

FIG. 1 shows the entire structure of the embodiment.

Figure 2:
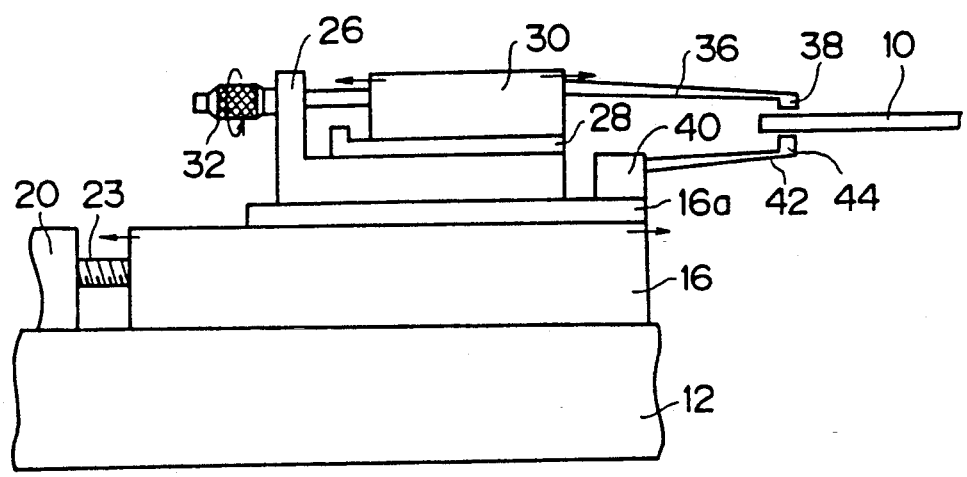
FIG. 2 shows an enlarged side view of the main portion of FIG. 1.

FIG. 2 shows an enlarged view of the main portion in FIG. 1.

In FIGS. 1 and 2, a hard disk 10 is removably set to a spindle motor 14 having an encoder on a bed 12 and rotates at a predetermined speed.

The carriages 16 and 18 are mounted on the bed 12 so that they face each other at positions 180° apart from each other across the hard disk 10. The carriage 16 is reciprocated by a ball screw mechanism 23 connected to a pulse motor 20 a line passing through the center of the hard disk 10 (spindle motor 14). The carriage 18 is also reciprocated by another ball screw mechanism connected to a pulse motor 22 on the line passing through the center of the hard disk 10 (spindle motor 14).

A fixed table 16a is mounted on the carriage 16 and an L-shaped micrometer mount 26 is mounted on the fixed table 16a. A sliding table 28 is secured on the micrometer mount 26.

A mount 30 is mounted on the sliding table 28 so that it can reciprocate on the line passing through the center of the hard disk 10, and one end of the mount 30 is secured to the end of a moving member of a micrometer 32 secured at the rising portion of the micrometer mount 26. When the thimble knob of the micrometer 32 is turned, the mount 30 reciprocates. A magnetic head mounting member 36 is extended toward the center of the front surface of the hard disk 10 and secured to the other end of the mount 30, and a fine-adjustment magnetic head 38 is secured to the end of the member 36.

Moreover, a mount 40 is secured to the fixed table 16a, and a the magnetic head mounting member 42 is extended toward the center of the back surface of the hard disk 10 and secured to the end of the mount 40. A fixed magnetic head 44 is set to the end of the magnetic head mounting member 42.

The fine-adjustment magnetic head 38 and fixed magnetic head 44 are reciprocated between both sides of the outside recording area [0], which is one of the two annular areas formed by dividing the magnetic-recording front surface and back surface of the hard disk 10, respectively, in accordance with the rotation of the pulse motor 20. An L-shaped micrometer mount 56 with a direction opposite to the micrometer mount 26 on the fixed table 16a is mounted on a fixed table 18a of the carriage 18, and a sliding table 58 is mounted on the mount 56. Moreover, a mount 60 is mounted on the table 58 so that it can reciprocate on a line passing through the center of the hard disk 10. One end of the mount 60 is secured to the end of the moving member of a micrometer 62 secured at the rising portion of the micrometer mount 56. When the thimble knob is turned, the mount 60 reciprocates. A magnetic head mounting member 66 is extended toward the center of the front surface of the hard disk 10 and secured to the other end of the mount 60, and a fine-adjustment magnetic head 68 is secured to the end of the member 66.

Moreover, a mount 70 is secured to the fixed table 18a, and a magnetic head mounting member 72 is extended toward the center of the back surface of the hard disk 10 (spindle motor 14) and secured to the end of the mount 70. A fixed magnetic head 74 is secured to the end of the member 72.

The fine-adjustment magnetic head 68 and fixed magnetic head 74 are reciprocated between both sides of the inside recording area [I], which is one of the two annular areas formed by dividing the magnetic-recording front surface and back surface of the hard disk 10, respectively, in accordance with the rotation of the pulse motor 22.

The spindle motor 14, pulse motors 20 and 22, fine-adjustment magnetic heads 38 and 68, and fixed magnetic heads 44 and 74 are connected to a signal processing system which performs signal processing related to the predetermined inspection to be described later.

The fine-adjustment magnetic head 38, fixed magnetic head 44, fine-adjustment magnetic head 68, and fixed magnetic head 74 are provided with a head loading mechanism (not shown) and each of the above magnetic heads approaches the hard disk surface at the time of inspection.

Figure 3:
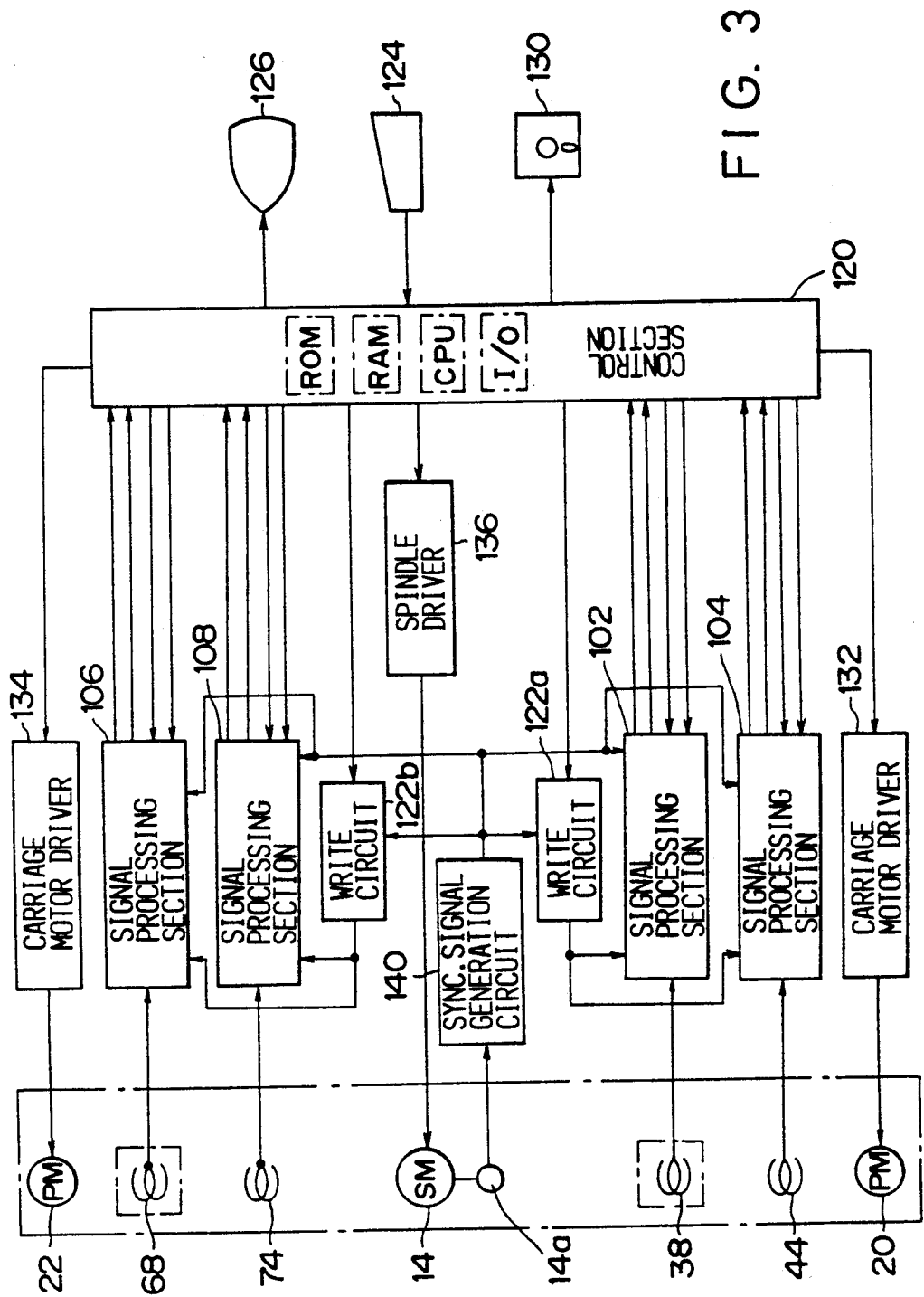
FIG. 3 shows a block diagram of the electric constitution of FIG. 1.

FIG. 3 is a block diagram showing the electric constitution. This example includes a measurement signal processing section 102 for feeding reproduction signals from the fine-adjustment magnetic head 38, a measurement signal processing section 104 to which reproduction signals are fed from the fixed magnetic head 44, a measurement signal processing section 106 to which reproduction signals are fed from the fine-adjustment magnetic head 68, and a measurement signal processing section 108 to which reproduction signals are fed from the fixed magnetic head 74.

Each of the measurement signal processing sections 102, 104, 106, and 108 comprises a known reproduction (R)/recording (W) selector circuit, an amplifying circuit, an output average value (TAA) section, and an error signal detecting section, which performs signal processing corresponding to the inspection items such as missing pulse errors, extra pulse errors, positive modulation, and negative modulation.

The measurement signal processing sections 102, 104, 106, and 108 are connected to a control section 120 for controlling this apparatus. The control section 120 mainly comprises an MPU and has a known CPU, RAM, and ROM storing an inspection control program, as well as an I/O unit.

The control section 120 connects with a write circuit 122a for generating high-frequency recording signals to output them to the measurement signal processing sections 102 and 104 for outside area [0] and a write circuit 122b for generating high-frequency recording signals to output them to the measurement signal processing sections 106 and 108 for inside area [I]. Moreover, the section 120 connects with a keyboard 124 for performing information input operation, an indicator (display) 126, and an external memory 130 for storing inspection information in a floppy disk or IC card.

The control section 120 connects with a carriage motor driver 132 connected to the pulse motor 20, a carriage motor driver 134 connected to the pulse motor 22, and a spindle driver 136 connected to the spindle motor 14.

In addition, the control section 120 is provided with a sync signal generating circuit 140 to which signals are fed from the encoder 14a mounted on the spindle motor 14, and sync signals generated by the circuit 140 are fed to the measurement signal processing sections 102, 104, 106, and 108 and the write circuits 122a and 122b.

The following is the description of the operation of the above structure.

In FIG. 1, the carriages 16 and 18 are moved backward so that the fine-adjustment magnetic heads 38 and 68 and the fixed magnetic heads 44 and 74 separate from the hard disk 10. In FIG. 3, the backward motion is performed by rotating the pulse motors 20 and 22 through the carriage motor drivers 132 and 134 from the control section 120 to which instruction signals are inputted from the keyboard 124.

Then, the hard disk 10 to be inspected is set to the top of the spindle motor 14. The carriage 16 is moved by the control section 120 so that the fine-adjustment magnetic head 38 and the fixed magnetic head 44 are brought to the inner end of the outside recording area [0] through the inspection instruction operation from the keyboard 124.

Then, the fine-adjustment magnetic head 38 and fixed magnetic head 44 are contacted with the hard disk 10 by the head loading mechanism before the spindle motor 14 is rotated by the control section 120. The fine-adjustment magnetic head 38 and fixed magnetic head 44 are lifted and then arranged at the reference position of the hard disk 10 in accordance with the movement of the carriage 16.

At this position, a recording signal is sent to the fixed magnetic head 44 from the write circuit 122a through the measurement signal processing section 104 by the control section 120 to magnetically record the data for one track on the back of the hard disk 10. This magnetically recorded track serves as the reference track for subsequent alignment.

Moreover, the carriage 18 is moved by the control section 120 so that the fine-adjustment magnetic head 68 and the fixed magnetic head 74 are brought to the recording position of the reference track, that is, to the inner end of the outside recording area [0]. In this case, the control for moving the carriage 18 back and forth is performed so that the level of the reproduction signal outputted by the fixed magnetic head 74 is maximized.

For this control, the control section 120 fetches the reproduction signal from the fixed magnetic head 74 through the measurement processing section 108 and detects the maximum TAA value. The detection is performed at the position obtained by computing the positions t1 and t2 before and after where TAA which is half the level of the maximum TAA is present and computing their arithmetic average (t1, t2)/2.

This position is used for the subsequent correction value by storing the movement distance of the pulse motor 22, rotated by the control section 120 through the carriage driver 134, in the RAM of the control section 120.

This completes the positional correction of the fixed magnetic head 74 with respect to the fixed magnetic head 44.

Then, the carriages 16 and 18 are moved backward so that the fine-adjustment magnetic heads 38 and 68 and the fixed magnetic heads 44 and 74 separate from the hard disk 10. This backward movement is performed by rotation of the pulse motors 20 and 22 from the control section 120 to which the instruction signal is inputted from the keyboard 124 through the carriage motor drivers 132 and 134.

Then, the hard disk 10 is inversely set to the spindle motor 14, in other words, the disk 10 is set to the motor 14 by turning the magnetic recording surface of the reference track upward.

Moreover, the correction value is read from the RAM so that the fine-adjustment magnetic heads 38 and 68 and the fixed magnetic heads 44 and 74 are brought to the recording position of the reference track and the control section 120 moves the carriages 16 and 18 according to the correction value.

In the above state, the fine-adjustment magnetic head 38 is fine-adjusted (reciprocated) on the line passing through the center of the hard disk 10 by turning the micrometer 32. In this case, the because TAA value of the position is displayed on the indicator 126, the position the where TAA value is maximized is searched by turning the micrometer 32. For the maximum TAA value, the fine-adjustment magnetic head 38 is located on the reference track.

The micrometer 62 also rotates to fine-adjust (reciprocate) the fine-adjustment magnetic head 68 on the line passing through the center of the hard disk 10 so that the TAA value to be displayed on the indicator 126 will be maximum.

Figure 4:
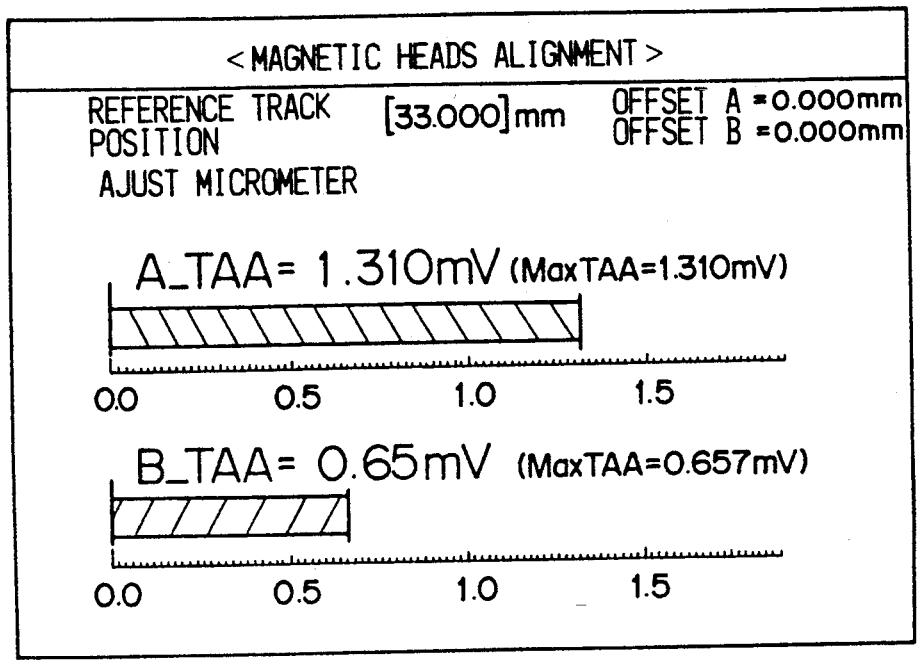
FIG. 4 shows the display screen of an indicator used to describe the operation of the embodiment.

FIG. 4 shows the display screen of the indicator 126 when the micrometer 32 and 62 are turned, in which the alignment of the fine-adjustment magnetic heads 38 and 68 is completed. In this case, the fine-adjustment magnetic head 38 is shown as [A] and the fine-adjustment magnetic head 68 is shown as [B].

In this manner, the fixed magnetic head 74 is positioned to the reference track magnetically recorded by the fixed magnetic head 44 and the fine-adjustment magnetic heads 38 and 68 are positioned to the reference track by fine-adjusting them with the micrometer. Thus, a pair of the fine-adjustment magnetic head 38 and the fixed magnetic head 44 can be aligned. Similarly, a pair of the fine-adjustment magnetic head 68 and the fixed magnetic head 74 can be aligned, accurate alignment between magnetic heads can easily be made, and neglected or double inspection of the recording track at the boundary between the inside recording area [I] and the outside recording area [0] can be prevented.

Moreover, alignment of each magnetic head can easily be made as mentioned above. For example, any one of the fine-adjustment magnetic head 38, fine-adjustment magnetic head 68, and fixed magnetic head 74 can easily be brought to a defective position on the hard disk 10 found by the fixed magnetic head 44. Thus, the characteristics of each magnetic head can easily be checked.

The following is the description of the operation of another embodiment.

For the above embodiment, magnetic recording of one track or the reference track is performed by the fixed magnetic head 44. However, another embodiment uses a hard disk 10 in which data is previously magnetically recorded in the reference track at a known radius position.

The alignment between a pair of the fine-adjustment, magnetic head 38 and fixed magnetic head 44 and the alignment between a pair of fine-adjustment magnetic head 68 and fixed magnetic head 74 using the above hard disk are the same as the operation after data is magnetically recorded in the above one reference track by the fixed magnetic head 44.

In this case, because the absolute position of the reference track can easily be detected, relative alignment between many pieces of equipment can easily be performed.

For the above embodiments, the carriages are arranged so that they face each other at positions 180° from each other across the spindle motor 14. However, it is also possible to arrange them at positions, for example, 90° or 60° from each other. For the above embodiments, description is made by using the outside recording area [0] and the inside recording area [I] formed by dividing the front surface and back surface of the hard disk 10 into two areas, respectively. However, it is also possible to further shorten the inspection time by dividing the front surface and back surface of the hard disk 10 into three or more areas, respectively, setting fine-adjustment magnetic heads, fixed magnetic heads, micrometers, and carriages for magnetically recording and reproducing data in and from these three or more areas, and performing control and operation similarly to the above embodiments.

As described above, the hard disk inspection apparatus of the present invention makes it possible to fine-adjust either one of each pair of magnetic heads reciprocating on the line passing through the center of a hard disk. Therefore, it is possible to easily and securely align a pair of magnetic heads for magnetically recording and reproducing data in and from areas made by dividing the front surface and back surface of the hard disk and improve the inspection efficiency.

What is claimed is:

1. A hard disk inspection apparatus comprising:
   a spindle for receiving and rotating a hard disk to be inspected;
   a plurality of pairs of magnetic heads for magnetically recording on and reproducing from a plurality of areas formed by annularly dividing magnetic recording surfaces of said hard disk;

a plurality of carriages for reciprocating each pair of magnetic heads on a line which passes through a center of said spindle; and a plurality of micrometric mechanisms for finely adjusting the radial position of either one of each pair of magnetic heads on said hard disk.

2. A hard disk inspection apparatus according to claim 1, wherein said spindle is rotated by a spindle motor having a rotary encoder controlled by a spindle driver circuit and coupled to a synchronous signal generating circuit.

3. A hard disk inspection apparatus according to claim 1, wherein said plurality of micrometric mechanisms are mounted on micrometer mounting members with interposition of sliding members, respectively, and finely reciprocate either one of said each pair of magnetic heads relative to said plurality of carriages, respectively.

4. A hard disk inspection apparatus according to claim 1, wherein said plurality of carriages are arranged to face each other at positions of 180° from each other across a center of said spindle.

* * * * *